United States Patent
Yamashita et al.

(10) Patent No.: US 8,734,582 B2
(45) Date of Patent: May 27, 2014

(54) DRIED GYPSUM COMPOSITION AND GYPSUM-BASED COATING

(75) Inventors: Takuji Yamashita, Tokyo (JP); Masato Yamaguchi, Tokyo (JP); Yoshikazu Tanaka, Tokyo (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 0 days.

(21) Appl. No.: 13/879,581

(22) PCT Filed: Nov. 28, 2011

(86) PCT No.: PCT/JP2011/077390
§ 371 (c)(1),
(2), (4) Date: Apr. 15, 2013

(87) PCT Pub. No.: WO2012/077523
PCT Pub. Date: Jun. 14, 2012

(65) Prior Publication Data
US 2013/0199418 A1    Aug. 8, 2013

(30) Foreign Application Priority Data

Dec. 10, 2010   (WO) .................. PCT/JP2010/072236

(51) Int. Cl.
| | |
|---|---|
| *C04B 28/14* | (2006.01) |
| *C04B 22/10* | (2006.01) |
| *C04B 22/12* | (2006.01) |
| *C04B 22/14* | (2006.01) |
| *C04B 24/04* | (2006.01) |
| *C04B 24/12* | (2006.01) |
| *C04B 24/34* | (2006.01) |
| *C04B 111/82* | (2006.01) |

(52) U.S. Cl.
USPC ........................................... 106/781; 106/778

(58) Field of Classification Search
USPC .................................................. 106/778, 781
See application file for complete search history.

(56) References Cited

U.S. PATENT DOCUMENTS

2005/0235882 A1    10/2005  Lettkeman et al.

FOREIGN PATENT DOCUMENTS

| JP | 10-273357 | 10/1998 |
|---|---|---|
| JP | 2000-239609 | 9/2000 |
| JP | 2005-119890 | 5/2005 |
| JP | 2005-521623 | 7/2005 |
| JP | 2009-249271 | 10/2009 |

*Primary Examiner* — Anthony J Green
(74) *Attorney, Agent, or Firm* — Hamre, Schumann, Mueller & Larson, P.C.

(57) ABSTRACT

Disclosed is a dry gypsum composition containing hemihydrate gypsum, at least one pigment and a crystal habit modifier. The crystal habit modifier is at least one compound selected from the group consisting of sulfate salts, carboxylate salts, carbonate salts and inorganic chlorides, and a content of the at least one compound is in a range of 0.1 to 5 parts by mass per 100 parts by mass of the hemihydrate gypsum, whereby upon hydration of the hemihydrate gypsum into dihydrate gypsum, the dihydrate gypsum is controlled to become plate crystals having an aspect ratio of 1 to 9. A gypsum-based coating formulation making use of the dry gypsum composition is also disclosed.

4 Claims, 1 Drawing Sheet

DRIED GYPSUM COMPOSITION AND GYPSUM-BASED COATING

TECHNICAL FIELD

This invention relates to a dry gypsum composition and gypsum-based coating formulation, each of which can inhibit the occurrence of color irregularity on a wall surface or the like formed with the composition or formulation. More specifically, the present invention is concerned with a dry gypsum composition before addition of water and a water-added and kneaded, gypsum-based coating formulation, each of which contains a pigment and is useful for the formation of a colored wall surface or the like.

BACKGROUND ART

Water-added and kneaded, wet coating formulations have conventionally been used as finishing materials for interior walls. A variety of materials are used as principal materials in wet coating formulations, but from the viewpoint of the fireproofness and comfort of formed interior walls, gypsum-based coating formulations are widely used. A gypsum-based coating formulation is generally commercialized as a dry gypsum composition, which contains calcined gypsum (in particular, hemihydrate gypsum) as a principal component and also contains various additives added as needed for the formation of a wall surface provided with functionality such as external attractiveness or moisture absorption/desorption properties. At a working site, the dry gypsum composition is added with water and kneaded, the resulting gypsum-based coating formulation obtained in a coatable form (hereinafter also called a "gypsum-based wet coating formulation" or "wet coating formulation") is coated on an underlayment such as a gypsum board by using a tool such as a trowel, and after setting and drying, a wall surface is completed.

With a view to reducing so-called sick building syndrome or the like which has become a social problem in recent years, a variety of materials (additions) are under study to make improvements in building materials. Gypsum-based coating formulations also include those equipped, for example, with an adsorbing function for formaldehyde, which is considered to be a cause of sick building syndrome or the like, by contriving its additives. A proposal has also been made on a gypsum-based wet coating formulation that owing to the addition of rosin, aluminum sulfate and the like, enables the formation of a smooth and high-accuracy, coated wall surface by single coating work (see Patent Document 1).

Concerning gypsum-based coating formulations used as finishing materials for interior walls, on the other hand, dry gypsum compositions, which are used after adding various pigments, respectively, to impart external attractiveness, are provided as commercial products. Wall surfaces formed with these materials present finished surfaces having a wide variety of colors. The addition of a pigment, which is needed in such a case, is generally conducted by a method that adds the pigment as needed at a working site. However, this method requires cumbersome work, and moreover, is difficult to evenly mix the pigment. Especially with a gypsum-based coating formulation which is basically white, the mixed state of its pigment has a high tendency of affecting the finished quality of an interior wall or the like. Accordingly, it is also practiced to provide, as products for gypsum-based coating formulations, dry gypsum compositions with various pigments added, respectively, at factories. These products make it possible to avoid the cumbersomeness of mixing pigments at working sites, and moreover, the use of these products makes it possible to realize the formation of evenly-colored interior walls free of color irregularity because they are provided as products with the pigments mixed stably and evenly.

Color irregularity may, however, occur after coating or dry finishing even when a gypsum-based coating formulation is prepared by adding water to a dry gypsum composition as a product with a pigment added beforehand. The present inventors, therefore, have come to recognize a problem that the high external attractiveness required for interior walls cannot be realized for the above-mentioned color irregularity.

In the meantime, a proposal has been made on a conventional finishing material, which contains an inorganic powder having particle sizes of greater than 0.1 mm, such as clay, silica stone powder and diatomaceous earth, and gypsum and is useful for forming clay walls. According to the proposal, a pigment itself is provided with improved color developing properties to avoid color irregularity on a finished surface (see Patent Document 2). Another proposal has been made on a hydraulic, color-finishing material composition containing alumina cement, gypsum and blast furnace slag. According to the proposal, a setting adjuster is added. The addition of this setting adjuster is described to provide not only excellent fast-setting properties, working characteristics and setting characteristics but also superb staining properties, and also to conduct both surface preparation of a floor underlayment and color finishing at the same time (see Patent Document 3).

These materials both contain gypsum as a filler, but their principal component is the inorganic powder, alumina cement or the like. In these proposals, no study was, therefore, made about the color irregularity on a coated surface formed with a dry gypsum composition which contains gypsum as a base material and is useful as a finishing material for an interior wall, although the present invention is concerned with such color irregularity. Further, a wet coating formulation which contains gypsum as a base material is basically white close to pure white. Therefore, the problem of its color irregularity cannot be equated with the color irregularity of conventional color-finishing materials containing as a principal component such a material as described above, and requires a new technical study. In other words, compared with the above-described materials of the conventional technologies, a wet coating formulation which contains gypsum as a base material is totally different in the color of the base material, and is also different in its setting characteristics and the like (working time and the like). Therefore, the wet coating formulation is obviously required to lessen this problem of the occurrence of color irregularity while satisfying working characteristics, setting characteristics and the like inherent to gypsum, to say nothing of the difference in the meaning of color irregularity. Incidentally, the term "working time" as described above means a time during which one prepared as a reaction-type, gypsum-based coating formulation by adding water to a dry gypsum composition and kneading the resulting mixture to permit coating on a wall can be subjected in a good state to coating work with a trowel or the like.

PRIOR ART DOCUMENTS

Patent Documents

Patent Document 1: JP-A-2000-239609
Patent Document 2: JP-A-2009-249271
Patent Document 3: JP-A-10-273357

DISCLOSURE OF THE INVENTION

Problem to be Solved by the Invention

Objects of the present invention are, therefore, to provide a dry gypsum composition containing gypsum as a base material and useful as a finishing material for an interior wall or the like, which as a gypsum-based coating formulation prepared by adding water to the dry gypsum composition, can satisfy functions such as working characteristics and setting characteristics, and upon formation of a wall surface or the like, can inhibit the occurrence of color irregularity and can provide the wall surface or the like with an even color and excellent external attractiveness, and also the gypsum-based coating formulation.

Means for Solving the Problem

The above-described objects can be achieved by the present invention to be described hereinafter. Described specifically, the present invention provides a dry gypsum composition comprising hemihydrate gypsum, at least one pigment and a crystal habit modifier, wherein the crystal habit modifier is at least one compound selected from the group consisting of sulfate salts, carboxylate salts, carbonate salts and inorganic chlorides, and a content of the at least one compound is in a range of 0.1 to 5 parts by mass per 100 parts by mass of the hemihydrate gypsum, whereby upon hydration of the hemihydrate gypsum into dihydrate gypsum, the dihydrate gypsum is controlled to become plate crystals having an aspect ratio of 1 to 9.

The present invention also provides a gypsum-based coating formulation capable of inhibiting occurrence of color irregularity, comprising water, hemihydrate gypsum, at least one pigment and a crystal habit modifier, wherein the crystal habit modifier is at least one compound selected from the group consisting of sulfate salts, carboxylate salts, carbonate salts and inorganic chlorides, and a content of the at least one compound is in a range of 0.1 to 5 parts by mass per 100 parts by mass of the hemihydrate gypsum, whereby upon hydration of the hemihydrate gypsum into dihydrate gypsum, the dihydrate gypsum is controlled to become plate crystals having an aspect ratio of 1 to 9.

As preferred embodiments of the above-described dry gypsum composition or gypsum-based coating formulation according to the present invention, the following embodiments can be mentioned: the crystal habit modifier is at least one compound selected from the group consisting of aluminum sulfate, potassium sulfate, magnesium sulfate, sodium succinate, sodium tartrate, calcium maleate, magnesium carbonate, sodium carbonate, potassium carbonate, sodium chloride and magnesium chloride; a working time is 60 minutes or longer but 120 minutes or shorter; it further comprises rosin; and it further comprises a hydrazide compound.

Advantageous Effects of the Invention

According to the present invention, there are provided a dry gypsum composition containing gypsum as a base material and effectively usable as a finishing material for an interior wall or the like, which, when kneaded together with water into a wet coating formulation, can satisfy functions such as working characteristics and setting characteristics, and upon formation of a wall surface or the like, can inhibit the occurrence of color irregularity and can provide the wall surface or the like with an even color and excellent external attractiveness, and also the gypsum-based coating formulation.

MODES FOR CARRYING OUT THE INVENTION

Figure 1:
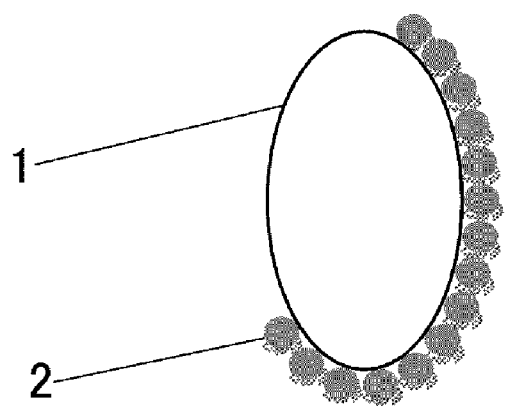
FIG. 1 is a schematic diagram illustrating a gypsum crystal in a gypsum-based coating formulation according to the present invention, with pigment particles being adhered on the gypsum crystal.

The present invention will hereinafter be described in detail based on preferred embodiments of the present invention.

Roughly dividing wall-finishing materials, there are generally two types, one being the reaction-setting type and the other the dry-setting type. The gypsum-based coating formulation is of the reaction-setting type that hemihydrate gypsum is used, and upon addition of water, a hydration reaction occurs and hemihydrate gypsum undergoes a phase change into dihydrate gypsum to set. Now, the term "hemihydrate gypsum" as used herein means one obtained by calcining dihydrate gypsum. Hemihydrate gypsum includes α-hemihydrate gypsum and β-hemihydrate gypsum, and in particular, the dry gypsum composition according to the present invention may be proportioned preferably such that β-hemihydrate gypsum becomes a base material (the content of β-hemihydrate gypsum becomes 50 mass % or higher) among the constituent materials of the composition. For providing improved strength when used as a wall-finishing material, it is also a preferred embodiment to use, as a hemihydrate gypsum material, one obtained by blending β-hemihydrate gypsum and α-hemihydrate gypsum at a ratio to be mentioned hereinafter. As a hemihydrate gypsum material suited for the present invention, illustrative is one having a mixing ratio of β-hemihydrate gypsum to α-hemihydrate gypsum at 30:1, preferably 20:1, more preferably 15:1 on a mass basis.

Irrespective of whether such a pigment-containing, wall-finishing material is of the reaction-setting type or of the dry-setting type, color irregularity may occur on a surface of the finishing material due to an external cause such as uneven water absorption of an underlayment. Especially in the case of a gypsum-based finishing material of the reaction-setting type with gypsum contained as a base material, to which the present invention is applied, color irregularity may rarely occur between an unreacted part (a dried-out part occurred as a result of the absorption of water from the finishing material into an underlayment) and a reaction-completed part. As common technologies for preventing such drying-out which is considered to become a cause of the occurrence of this color irregularity, the below-mentioned methods are known.

One of the methods is to prevent drying-out by coating an underlayment with an underlayment-conditioning agent such as a primer or curing material such that the absorption of water from the gypsum-based coating formulation coated on the underlayment is controlled. This method is, however, accompanied by a practical problem that an additional step is needed to coat an underlayment-conditioning material or the like and a delay is thus induced in the work schedule. The other method is to prevent the occurrence of drying-out by adding a water retention agent such as methylcellulose to increase the water retention properties of the gypsum-based coating formulation. The addition of such a water retention agent is also an effective method from the standpoint of assuring a long working time. The addition of the water retention agent in a large amount, however, results in a high viscosity when water is added and kneading is performed. As a consequence, another problem arises in that the workability is impaired upon coating. These conventional methods involve their own problems as described above, and for the effective prevention of drying-out which is considered to be a cause of the occurrence of color irregularity, a further study is needed to develop a good method that requires no complex steps and is also excellent in workability.

The present inventors have enthusiastically conducted a study on gypsum-based coating formulations, which contain one or more pigments and are materials for forming colored wall surfaces, with a view to developing a gypsum-based coating formulation capable of forming an interior wall having an even color applied thereto without color irregularity and excellent external attractiveness and having an appropriate working time and excellent workability, and as a result, have obtained the below-described findings, leading to the present invention. Described specifically, it has been found that the incorporation of a compound, which functions as a crystal habit modifier, in a specific amount in a dry gypsum composition to be provided as a product for a gypsum-based coating formulation can control the crystal shape of gypsum to have a particular aspect ratio upon hydration reaction of the gypsum when the dry gypsum composition is added with water and kneaded into the coating formulation, and that as a result, the formation of a wall surface or the like of an even color inhibited in the occurrence of color irregularity is enabled without impairment to the working characteristics, setting characteristics or the like upon coating. According to the study by the present inventors, the hemihydrate gypsum as a principal component in the dry gypsum composition according to the present invention, which contains the specific crystal habit modifier in the particular amount as specified in the present invention, undergoes a phase change through a hydration reaction into dihydrate gypsum with an aspect ratio thereof being controlled to 1 to 9 when the composition is kneaded together with water. More preferred in the present invention can be one controlled to have 3 to 8 as the above-described aspect ratio.

As a method for adjusting the setting time of a gypsum-containing coating formulation kneaded together with water and containing a pigment and hemihydrate gypsum, it has been a conventional practice to use a retarder alone as an additive. With this method, however, the final setting time is also unavoidably delayed to assure a sufficient working time, so that the final setting time cannot be controlled. As a consequence, the formation of an interior wall with such a coating material product, therefore, is rather prone to the occurrence of color irregularity due to drying-out. According to the study by the present inventors, it has been found that, when water is added to such a conventional product for a coating formulation, crystals available upon the hydration reaction of hemihydrate gypsum are acicular crystals having a large aspect ratio unlike the coating formulation according to the present invention.

In the course of the studies to achieve the above-described objects, the present inventors found that the problem of color irregularity can be solved by adding a sulfate salt such as aluminum sulfate in a predetermined amount within the range specified in the present invention to a gypsum-based coating formulation kneaded together with water and containing a pigment and hemihydrate gypsum. It was found that a similar effect can also be brought about by the addition of a carboxylate salt, carbonate salt or inorganic chloride. Aluminum sulfate has conventionally been used for the purpose of shortening the final setting time of gypsum and providing improved hydration properties. It was also found that, when the amount of aluminum sulfate to be added is controlled and aluminum sulfate is incorporated at a rate of 0.1 to 5 parts by mass per 100 parts by mass of hemihydrate gypsum, only the final setting time of gypsum can be shortened and drying-out can be inhibited, without making its working time shorter. As a result of a further detailed study, it was also found that the crystal shape of gypsum upon hydration can be controlled when a dry gypsum composition with aluminum sulfate added in the above-described specific amount is kneaded together with water into a wet coating formulation. Described more specifically, each conventional product turns to acicular crystals of large aspect ratio when water is added to the dry gypsum composition to hydrate it before coating. On the other hand, the addition of, for example, aluminum sulfate in an amount within the range specified in the present invention allows this compound to function as a crystal habit modifier so that plate crystals of small aspect ratio are formed.

Figure 2:
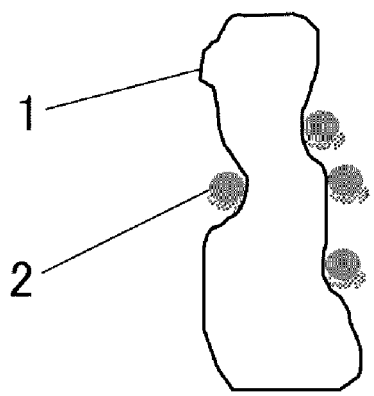
FIG. 2 is a schematic diagram illustrating a gypsum crystal in a gypsum-based coating formulation as a conventional example, with pigment particles being adhered on the gypsum crystal.

About the reason for which the occurrence of color irregularity on a formed wall surface or the like was inhibited by the above-described features, the present inventors consider as will be described hereinafter. Described specifically, in a conventional finishing coating formulation, hemihydrate gypsum has been hydrated with pigment particles being held in concavities of crystals formed by the hydration as schematically illustrated in FIG. 2. When the dry gypsum composition according to the present invention, said composition containing the specific crystal habit modifier added in the particular amount range, on the other hand, crystal shapes are controlled upon hydration of hemihydrate gypsum as a result of kneading of the composition together with water, so that the resulting crystals are provided with smooth surfaces without concavities. The present inventors consider that the foregoing is the reason for which the occurrence of color irregularity was successfully inhibited. Described more specifically, it was first confirmed that, when hemihydrate gypsum is hydrated with water in the presence of a crystal habit modifier such as a sulfate salt, carboxylic acid or carbonate salt, crystal growth occurs with the crystal habit modifier taking part as a third material, and hence, the resulting crystals are clearly different in shape compared with those available when hemihydrate gypsum is simply hydrated with water. It is known that the aspect ratio and surface area vary with the crystal shape. The present inventors then found that the use of such a crystal habit modifier as described above in an amount within the range specified in the present invention is effective for the achievement of the objects of the present invention, leading to the achievement of the present invention. Described still more specifically, when the hydration reaction takes place in the presence of such an added crystal habit modifier (third material) as described above, the third material is adsorbed on the surfaces of the solid phase (hemihydrate gypsum) so that the surfaces are covered and crystal growth is inhibited. According to the study by the present inventors, the existence of the third material inhibits the growth in the direction of the c-axis along which the growth rate is particularly high. The present inventors further consider that upon hydration, the limitation of its amount to the small amount range specified in the present invention makes it possible to form plate crystals having a small aspect ratio, specifically an aspect ratio of 1 to 9 and to obtain crystals with a small specific surface area, and as a result, the significant advantageous effects of the present invention can be obtained.

In view of the above-described results, it is presumed that, when the dry gypsum composition according to the present invention was used and was kneaded together with water into the gypsum-based coating formulation according to the present invention, pigment particles 2 were adhered on and along the outer periphery of each gypsum crystal 1 upon hydration of hemihydrate gypsum as schematically illustrated in FIG. 1 and were not held in concavities in the surface of each crystal of gypsum as in a conventional gypsum-based coating formulation, and therefore, the formation of a wall surface free of color irregularity was enabled. A description will hereinafter be made about the respective components that make up the dry gypsum composition or gypsum-based coating formulation according to the present invention.

As the crystal habit modifier that characterizes the present invention, a compound selected from the group consisting of sulfate salts, carboxylate salts, carbonate salts and inorganic chlorides can be used. The sulfate salts include aluminum sulfate, potassium sulfate, magnesium sulfate, and the like. The carboxylate salts include sodium succinate, sodium tartrate, calcium maleate, and the like. The carbonate salts include magnesium carbonate, sodium carbonate, potassium carbonate, and the like. The inorganic salts include sodium chloride, magnesium chloride, and the like. Among these, sulfate salts such as aluminum sulfate, potassium sulfate and magnesium sulfate are preferred.

Such a crystal habit modifier needs to be added in a range of 0.1 to 5 parts by mass per 100 parts by mass of hemihydrate gypsum. The optimal range of the amount of the crystal habit modifier to be added differs depending on the kind of the crystal habit modifier, but can be determined with a final setting time and working time in mind. In the case of a sulfate salt such as aluminum sulfate or potassium sulfate, for example, the sulfate salt may be added in an range of preferably 0.1 to 5 parts by mass, more preferably 1 to 5 parts by mass. If the crystal habit modifier is added in an unduly small amount, the inhibiting effect for the occurrence of color irregularity cannot be obtained sufficiently, and moreover, the final setting time becomes longer to result in reduced work efficiency. If the crystal habit modifier is added in an excessively large amount, on the other hand, the hydration of the gypsum-based coating formulation proceeds quickly, thereby raising another problem in that no sufficient working time can be assured.

Pigments usable in the present invention include inorganic pigments and organic pigments having various colors as will be described hereinafter. As inorganic pigments, oxides such as zinc oxide, iron oxides, titanium dioxide and chromium oxide, hydroxides such as alumina and yellow iron oxide, chromate salts such as chrome yellow and zinc chromate, silicate salts such as talc and ultramarine, carbonate salts such as calcium carbonate and white lead, carbon black, phosphate salts, and the like can be used as needed. As organic pigments, on the other hand, azo-based pigments, nitro-based pigments, nitroso-based pigments, phthalocyanine pigments, fused polycyclic pigments, and the like can be used in predetermined amounts. Further, lake pigments can also be used. It is, however, to be noted that the present invention is not limited to the use of these pigments.

The term "working time" as used herein means "a time during which coating work can be performed with the workability being maintained well". Concerning the gypsum-based coating formulation according to the present invention, this working time may preferably be 60 minutes or longer but 120 minutes or shorter from a practical viewpoint. A working time shorter than 60 minutes is not preferred because of a potential problem that the gypsum-based coating formulation may undergo setting before completion of coating work unless work is performed quickly. On the other hand, a working time longer than 120 minutes is not preferred either because setting may take an excessively long time and the subsequent work may not be started.

The dry gypsum composition according to the present invention contains hemihydrate gypsum as a principal component, but as mentioned above, may be proportioned preferably such that β-hemihydrate gypsum is contained as a principal component in its constituent materials (the content of β-hemihydrate gypsum becomes 50 mass % or higher). It is also a preferred embodiment to use hemihydrate gypsum with α-hemihydrate gypsum blended in β-hemihydrate gypsum for strength enhancement or the like. As a hemihydrate gypsum material prepared by blending α-hemihydrate gypsum in β-hemihydrate gypsum, it is possible to use one prepared by blending β-hemihydrate gypsum and α-hemihydrate gypsum at a ratio of 30:1 to 2:1. It is more preferred to use a hemihydrate gypsum material prepared by blending β-hemihydrate gypsum and α-hemihydrate gypsum at a ratio of 30:1 to 15:1 such that β-hemihydrate gypsum is contained much more.

As a further preferred embodiment of the dry gypsum composition according to the present invention, the dry gypsum composition may be formulated by further adding an aggregate, diatomaceous earth and other additives to a hemihydrate gypsum material as a principal component. The amounts of the hemihydrate gypsum and the aggregate and/or diatomaceous earth in the dry gypsum composition when formulated into such an embodiment may preferably be set as will be described below. Described specifically, when the whole dry gypsum composition is assumed to be 100 parts by mass, it is preferred to set the hemihydrate gypsum at 80 parts by mass or more and to set the total amount of the aggregate and diatomaceous earth at 20 parts by mass or less. In the above-described embodiment, it is obviously possible to incorporate only an aggregate or only diatomaceous earth in addition to hemihydrate gypsum. As the aggregate for use in the present invention, calcium carbonate or the like can be employed, for example. As the other additives for use in the dry gypsum composition according to the present invention, conventionally known additives for wet coating formulations, such as accelerators and retarders, can be employed.

The dry gypsum composition or gypsum-based coating formulation according to the present invention may also be formulated preferably as an embodiment having formaldehyde adsorption and decomposition performance. Described specifically, a hydrazide compound may be added to impart the above-described function. The amount of the hydrazide compound may preferably be 0.1 parts by mass to 10 parts by mass per 100 parts by mass of hemihydrate gypsum.

When water is added to the dry gypsum composition according to the present invention to prepare the gypsum-based coating formulation, the mixing rate of water may be set at, for example, 50% to 100%, preferably 60 to 70% on a mass basis.

The dry gypsum composition or gypsum-based coating formulation according to the present invention may further contain rosin. The amount of rosin to be added may be preferably 0.3 to 3 parts by mass per 100 parts by mass of hemihydrate gypsum. The inclusion of rosin provides the resulting interior wall or the like with adequate water repellency.

EXAMPLES

Based on examples of the present invention and comparative examples, the present invention will hereinafter be described in further detail. The designations of "parts" and "%" are on a mass basis unless otherwise specifically indicated.

Examples 1 to 13 and Comparative Examples 1-3

Preparation of Hemihydrate Gypsum
Provided as hemihydrate gypsum for use in the examples and comparative examples was a material prepared by blending β-hemihydrate gypsum and α-hemihydrate gypsum to give a ratio of 15:1 on a mass basis.

Preparation of Dry Gypsum Compositions

Dry gypsum compositions of Examples 1 to 13 and Comparative Examples 1 to 3 were each obtained by adding, to the hemihydrate gypsum (100 parts) prepared as described above, iron oxide (brown type, 1 parts) as a pigment and the corresponding compound, which is shown in Table 1-1, 1-2 or 1-3, as a crystal habit modifier in the corresponding amount shown in Table 1-1, 1-2 or 1-3, and thoroughly mixing them in a mixer. It is to be noted that the dry gypsum compositions each further contained calcium carbonate (10 parts by mass) and diatomaceous earth (8 parts by mass).

Evaluation (1) Rating of Color Irregularity

To the dry gypsum composition of each example or comparative example obtained as described above, water was added at a mixing rate of 62%, followed by kneading into a gypsum-based coating formulation of the example or comparative example. Using the thus-obtained coating formulation, two gypsum boards of 30 cm×30 cm (board thickness: 9.5 mm) were coated at surfaces thereof to a thickness of 3 mm, followed by setting to obtain two set boards the surfaces of which were colored. The resultant test boards were cured until being hardened while paying attention to avoid drying-out. After the hardening, the test boards were cured further for 24 hours in a drier controlled at 40° C. to provide test specimens for evaluation.

The two test specimens obtained as described above were measured for surface chromaticity by a colorimeter ("Color Meter ZE-2000", trade name; manufactured by Nippon Denshoku Industries Co., Ltd.), and the occurrence of color irregularity was rated by the below-described method. The results are shown under "Rating of color irregularity" in Table 1-1, 1-2 or 1-3. Described specifically, the two test specimens obtained as described above were visually observed, one of the test specimens, said one specimen being clearly freer from the occurrence of color irregularity, was chosen, and with respect to the test specimen so chosen, its colored surface was measured for chromaticity by the above-described colorimeter. Further, a chromaticity region was set as reference values for the reference color, and using those reference values, the chosen test specimen was rated. Specifically, the rating was conducted as will be described hereinafter. First, from the chromaticity on a test specimen which was free from any excessive absorption of water from a gypsum-based coating formulation into an underlayment and was evidently determined to have evenly completed through the hydration reaction, L value: 65.2±3, a value: 2.35±0.3 and b value: 18.9±0.5 were determined to be a chromaticity region for the reference color. By a similar colorimeter, the test specimens (set boards) for evaluation, which had been obtained beforehand and were different in composition and production conditions, were measured for surface chromaticity. Each test specimen (set board) was rated "A" when its chromaticity fell within the region of the reference color, while each test specimen (set board) was rated "B" when its chromaticity fell outside the region of the reference color. The rating results so obtained are shown under "Rating of color irregularity" in Tables 1-1, 1-2 and 1-3.

(2) Rating of Working Time

On the gypsum-based coating formulation of each example or comparative example obtained as described above, its working time was measured and was rated according to the below-described standards. First, water was added to the corresponding dry gypsum composition, followed by kneading to prepare the gypsum-based coating formulation for enabling to coat a wall. With respect to the gypsum-based coating formulation, the time during which the gypsum-based coating formulation would permit coating work by a trowel or the like in a good state was measured, and the time was recorded as a working time. As rating standards, each gypsum-based coating formulation the working time of which was 60 minutes or longer was rated "A", while each gypsum-based coating formulation the working time of which was shorter than 60 minutes was rated "B". The rating results so obtained are shown under "Rating of working time" in Tables 1-1, 1-2 and 1-3.

(3) Aspect Ratios

Each test specimen produced above in the rating of color irregularity (1) was measured for aspect ratio. Described specifically, the test specimen was photographed under SEM, and as locations for the measurement of crystal aspect ratio, 10 locations were selected at will per test specimen, and measurement was conducted at each location. An average value of the aspect ratios so obtained was recorded as the aspect ratio of the test specimen. The results are shown in the column of "Aspect ratio" in the corresponding table. The measurement results are shown in Table 1-1, 1-2 and 1-3.

(4) Measuring Method of Specific Surface Area

Using "MICROTRAC HRA" (manufactured by Nikkiso Co., Ltd.) as a measuring instrument, specific surface area was determined. It is a specific surface area ($m^2/mL$) when particles are all assumed to be spheres as a measurement principle.

(5) Overall Evaluation

An overall evaluation was made according to the standards to be described next. Described specifically, each gypsum-based coating formulation rated "A" in both the above-described rating of working time and rating of color irregularity was evaluated as "A", while each gypsum-based coating formulation rated "B" in either of the ratings was evaluated as "B".

TABLE 1-1

Basic Compositions and Evaluation Results of Coating Formulations

|  | Comp. Ex. 1 | Comp. Ex. 2 | Comp. Ex. 3 | Ex. 1 | Ex. 2 | Ex. 3 |
| --- | --- | --- | --- | --- | --- | --- |
| Hemihydrate gypsum (parts by mass) | 100 | 100 | 100 | 100 | 100 | 100 |
| Pigment (parts by mass) | 1 | 1 | 1 | 1 | 1 | 1 |
| Aluminum sulfate (parts by mass) | 0 | 10 | 0.02 | 5 | 1 | 0.1 |
| Final setting time (hr:min) | 4:00 | 2:00 | 3:50 | 2:30 | 3:00 | 3:30 |
| Working time (min) | 70 | 45 | 85 | 60 | 70 | 85 |
| Rating of working time | A | B | A | A | A | A |
| L value (brightness) | 73.22 | 64.91 | 71.21 | 65.81 | 64.28 | 67.80 |
| a value (+red to −green) | 1.58 | 2.51 | 1.74 | 2.44 | 2.39 | 2.17 |
| b value (+yellow to −blue) | 16.52 | 18.59 | 17.24 | 18.82 | 19.19 | 18.51 |

TABLE 1-1-continued

Basic Compositions and Evaluation Results of Coating Formulations

|  | Comp. Ex. 1 | Comp. Ex. 2 | Comp. Ex. 3 | Ex. 1 | Ex. 2 | Ex. 3 |
|---|---|---|---|---|---|---|
| Rating of color irregularity | B | A | B | A | A | A |
| Aspect ratio (—) | 15.8 | 2.6 | 11.7 | 3.7 | 5.9 | 7.4 |
| Specific surface area (m²/mL) | 1.35 | 0.38 | 1.21 | 0.54 | 0.61 | 0.75 |
| Overall evaluation | B | B | B | A | A | A |

TABLE 1-2

Basic Compositions and Evaluation Results of Coating Formulations

|  | Ex. 4 | Ex. 5 | Ex. 6 | Ex. 7 |
|---|---|---|---|---|
| Hemihydrate gypsum (parts by mass) | 100 | 100 | 100 | 100 |
| Pigment (parts by mass) | 1 | 1 | 1 | 1 |
| Potassium sulfate (parts by mass) | 5 | 0 | 0 | 0 |
| Calcium maleate (parts by mass) | 0 | 5 | 1 | 0.1 |
| Final setting time (hr:min) | 2:50 | 3:20 | 3:00 | 2:40 |
| Working time (min) | 75 | 110 | 90 | 80 |
| Rating of working time | A | A | A | A |
| L value (brightness) | 64.80 | 66.11 | 65.73 | 64.94 |
| a value (+red to −green) | 2.25 | 2.15 | 2.22 | 2.19 |
| b value (+yellow to −blue) | 18.58 | 19.31 | 19.21 | 18.63 |
| Rating of color irregularity | A | A | A | A |
| Aspect ratio (-) | 5.9 | 3.8 | 5.1 | 7.8 |
| Specific surface area (m²/mL) | 0.65 | 0.46 | 0.58 | 0.78 |
| Overall evaluation | A | A | A | A |

TABLE 1-3

Basic Compositions and Evaluation Results of Coating Formulations

|  | Ex. 8 | Ex. 9 | Ex. 10 | Ex. 11 | Ex. 12 | Ex. 13 |
|---|---|---|---|---|---|---|
| Hemihydrate gypsum (parts by mass) | 100 | 100 | 100 | 100 | 100 | 100 |
| Pigment (parts by mass) | 1 | 1 | 1 | 1 | 1 | 1 |
| Sodium carbonate (parts by mass) | 5 | 1 | 0.1 | 0 | 0 | 0 |
| Magnesium chloride (parts by mass) | 0 | 0 | 0 | 5 | 1 | 0.1 |
| Final setting time (hr:min) | 3:15 | 3:00 | 2:30 | 3:30 | 2:45 | 2:30 |
| Working time (min) | 100 | 95 | 80 | 100 | 90 | 70 |
| Rating of working time | A | A | A | A | A | A |
| L value (brightness) | 63.97 | 64.16 | 65.17 | 66.23 | 65.37 | 67.19 |
| a value (+red to −green) | 2.31 | 2.41 | 2.49 | 2.59 | 2.61 | 2.57 |
| b value (+yellow to −blue) | 18.71 | 18.48 | 18.56 | 18.86 | 18.93 | 19.13 |
| Rating of color irregularity | A | A | A | A | A | A |
| Aspect ratio (—) | 4.1 | 4.9 | 6.3 | 3.9 | 6.9 | 8.2 |
| Specific surface area (m²/mL) | 0.58 | 0.61 | 0.71 | 0.56 | 0.79 | 0.67 |
| Overall evaluation | A | A | A | A | A | A |

LEGEND

1 Gypsum crystal
2 Pigment particles

The invention claimed is:

1. A dry gypsum composition consisting essentially of:
hemihydrate gypsum prepared by blending β-hemihydrate gypsum and α-hemihydrate gypsum at a ratio from 30:1 to 2:1;
at least one pigment;
a crystal habit modifier;
rosin;
a hydrazide compound;
at least one retarder; and
an additive,
wherein the crystal habit modifier is at least one compound selected from the group consisting of sulfate salts, carboxylate salts, carbonate salts and inorganic chlorides,
the additive is at least one material selected from the group consisting of diatomaceous earth and calcium carbonate, and
a content of the at least one compound is in a range from 0.1 to 5 parts by mass per 100 parts by mass of the hemihydrate gypsum, whereby upon hydration of the hemihydrate gypsum into dihydrate gypsum, the dihydrate gypsum is controlled to become plate crystals having an aspect ratio from 1 to 9.

2. A gypsum-based coating formulation capable of inhibiting occurrence of color irregularity, consisting essentially of:
water;
hemihydrate gypsum prepared by blending β-hemihydrate gypsum and α-hemihydrate gypsum at a ratio from 30:1 to 2:1;
at least one pigment;
a crystal habit modifier;
rosin;
a hydrazide compound;
at least one retarder; and
an additive,
wherein the crystal habit modifier is at least one compound selected from the group consisting of sulfate salts, carboxylate salts, carbonate salts and inorganic chlorides,
the additive is at least one material selected from the group consisting of diatomaceous earth and calcium carbonate, and
a content of the at least one compound is in a range from 0.1 to 5 parts by mass per 100 parts by mass of the hemihydrate gypsum into dihydrate gypsum, the dihydrate gypsum is controlled to become plate crystals having an aspect ratio from 1 to 9.

3. The gypsum-based coating formulation according to claim 2, wherein the crystal habit modifier is at least one compound selected from the group consisting of aluminum sulfate, potassium sulfate, magnesium sulfate, sodium succinate, sodium tartrate, calcium maleate, magnesium carbonate, sodium carbonate, potassium carbonate, sodium chloride and magnesium chloride.

4. The gypsum-based coating formulation according to claim 2, wherein a working time is 60 minutes or longer but 120 minutes or shorter.

\* \* \* \* \*